UNITED STATES PATENT OFFICE 2,408,694

METHOD OF PREPARING ACYL GUANIDINES

John Kenson Simons, Toledo, Ohio, and Welcome I. Weaver, Pittsburgh, Pa., assignors, by mesne assignments, to Libbey-Owens-Ford Glass Company, a corporation of Ohio No Drawing. Application May 29, 1942, Serial No. 445,091

1 Claim. (Cl. 260—564)

The invention relates to the preparation of acyl guanidines.

Guanamines, which are 4,6-damino triazines having the structural formula:

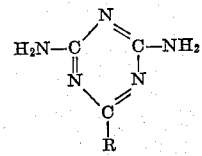

are useful for reaction with formaldehyde to produce thermosetting resins. However, no method has heretofore been known for producing guanamines in satisfactory yields.

The present invention is based on the discovery of a method of preparing acyl guanidines having the structural formula:

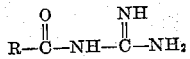

in good yields, and of a simple and effective method of preparing guanamines from acyl guanidines. The principal object of the invention is to provide a simple and economical method for the preparation of acyl guanidines in good yields and a simple and effective method of converting acyl guanidines into guanamines. More specific objects and advantages are apparent from the description, which discloses and illustrates the invention, and is not intended to impose limitations upon the claim.

In accordance with the present invention, acyl guanidines are prepared by reacting guanidine in concentrated organic solution with an ester of an organic carboxylic acid, and the corresponding guanamines are prepared by heating the acyl guanidines above their melting points. Any desired ester may be used for the reaction with guanidine.

The present method is versatile in that a large variety of esters may be used for the reaction with guanidine, to give various acyl guanidines which may be converted into corresponding guanamines that, by reacting with formaldehyde, produce resins having widely varied properties fitting them for various uses.

In preparing an acyl guanidine a freshly prepared concentrated solution of guanidine in anhydrous alcohol or dry dioxane is preferably used. The acyl guanidine after purification is heated above its melting point, preferably at about 190°–210° C., in an oil bath, to convert it to the guanamine. The proportion of guanidine to the ester that is used in the reaction to form the acyl guanidine may be varied within wide limits, but it is believed that the proportion that actually takes part in the reaction is 1 mole of guanidine for each mole of the ester. The reaction of the guanidine with the ester is exothermic so that heating is not necessary. Preferably the reaction between the guanidine and the ester is allowed to proceed to equilibrium for example by allowing the solution to stand over night.

Example 1

18 parts of powdered guanidine carbonate and 5 parts of sodium are vigorously stirred in 100 parts of absolute ethyl alcohol or dry p-dioxane. After the completion of the reaction, the resulting solution of guanidine is filtered, and then concentrated by evaporation under vacuum. Addition of an approximately equivalent amount of freshly distilled ester brings about an exothermic reaction with precipitation of the crystalline acyl guanidine. After the solution has been allowed to stand over night, the crystals are separated by filtration. A further yield may be obtained by concentrating the filtrate if desired. The product may be purified by recrystallization from alcohol or p-dioxane, and the yields vary from 40 to 80%. Esters that may be used in this reaction are ethyl formate, ethyl acetate, ethyl propionate, ethyl benzoate, ethyl n-valerate, ethyl phenylacetate, ethyl butyrate, ethyl oleate, and methyl laurate. The resulting products are formyl guanidine melting at 178°–180° C., acetyl guanidine melting at 184°–186° C., propionyl guanidine melting at 151°–153° C., benzoyl guanidine melting at 158°–160° C., valeryl guanidine melting at 163°–164° C., phenylacetyl guanidine melting at 166°–167° C., butyryl guanidine melting at 170°–171° C., oleyl guanidine, a soapy non-crystalline product, and lauryl guanidine melting at 80°–82° C.

Example 2

An acyl guanidine prepared in accordance with Example 1 is heated on an oil bath at about 190°–210° C. for about one-half hour. 2 molecules of the acyl guanidine combine with the loss of 1 molecule of water and 1 molecule of the acyl amide, producing 1 molecule of the guanamine. The reaction is exothermic and the product may be purified by recrystallization from hot water to give yields from 40 to 95%. By this method there may be prepared formo-guanamine having a melting point above 300° C., aceto-guanamine having a melting point of 252°–255° C., propiono-guanamine which sublimes above 230° C., benzoguanamine having a melting point of 215°–218° C., phenylaceto-guanamine having a melting point of 185°–190° C., butyro-guanamine having a melting point of 195° C., valero-guanamine having a melting point of 168° C., and lauro-guanamine having a melting point of 280°–290° C.

Various embodiments of the invention may be devised to meet various requirements.

Having described the invention, we claim:

A method of preparing acyl guanidines that comprises reacting guanidine carbonate with an alkali metal in an anhydrous solvent selected from the class consisting of ethyl alcohol and p-dioxane, concentrating the resulting solution of guanidine, and reacting with an ester of an acid selected from the class consisting of alkyl, aryl and mixed alkyl and aryl carboxylic acids, to introduce into the guanidine molecule the acyl radical of said acid.

JOHN KENSON SIMONS.
WELCOME I. WEAVER.